United States Patent
Mitterholzer

(10) Patent No.: US 6,859,677 B2
(45) Date of Patent: Feb. 22, 2005

(54) ASSEMBLY VERIFICATION METHOD AND INSPECTION SYSTEM

(75) Inventor: Rudolph Mitterholzer, Cheboygan, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 531 days.

(21) Appl. No.: 10/052,932

(22) Filed: Oct. 25, 2001

(65) Prior Publication Data

US 2003/0081825 A1 May 1, 2003

(51) Int. Cl.$^7$ .............................................. G06F 19/00
(52) U.S. Cl. ..................... 700/110; 700/114; 700/117; 700/258; 700/259
(58) Field of Search ................................ 700/110, 114, 700/117, 259

(56) References Cited

U.S. PATENT DOCUMENTS

| | | | | |
|---|---|---|---|---|
| 4,052,603 A | * | 10/1977 | Karlson | 700/192 |
| 4,360,274 A | * | 11/1982 | Norton-Wayne | 356/394 |
| 4,389,669 A | * | 6/1983 | Epstein et al. | 348/126 |
| 4,827,423 A | * | 5/1989 | Beasley et al. | 700/96 |
| 4,862,377 A | * | 8/1989 | Reedman et al. | 700/114 |
| 4,918,627 A | * | 4/1990 | Garcia et al. | 702/82 |
| 4,941,106 A | * | 7/1990 | Krieger | 700/259 |
| 5,093,867 A | * | 3/1992 | Hori et al. | 382/141 |
| 5,461,570 A | * | 10/1995 | Wang et al. | 700/110 |
| 5,602,967 A | * | 2/1997 | Pryor | 700/259 |
| 5,768,138 A | * | 6/1998 | Ruotolo | 700/186 |
| 6,298,149 B1 | * | 10/2001 | Nichani et al. | 382/149 |
| 2003/0025087 A1 | * | 2/2003 | Schamber et al. | 250/491.1 |

* cited by examiner

*Primary Examiner*—Leo Picard
*Assistant Examiner*—Michael D. Masinick
(74) *Attorney, Agent, or Firm*—Jeffrey P. Calfa; Dennis Kelly Sullivan; Susan L. Lukasik

(57) ABSTRACT

A system and method for verifying proper assembly of devices such as a vehicle that are constructed of two or more components assembled to one another. According to the method the device is placed within an inspection area of the inspection system and a two-dimensional image of the device or electronic data with a two-dimensional image of the device encoded within it is created through the use of inspection cameras aimed at the inspection area of the inspection system. Predetermined locating features of two or more of the components of the device are located within the two-dimensional image or the electronic data within which the two-dimensional image is encoded. Relative positions and/or relative orientations of these two or more components can thereafter be calculated and compared to preferred relative positions and/or relative orientations of the components. Thereafter the relative positions and/or relative orientations of these devices may be adjusted toward their preferred relative positions and/or relative orientations.

12 Claims, 3 Drawing Sheets

ASSEMBLY VERIFICATION METHOD AND INSPECTION SYSTEM

BACKGROUND OF THE INVENTION

This invention relates to the process of assembling devices that have two or more components. Many devices are constructed by assembling two or more individual components together. The construction of the individual components of many such devices that comprise two or more components assembled together is often such that the individual components may be engaged to one another in any of a number of different relative positions and orientations relative to one another within ranges which result from the construction of the components. Additionally, there is generally a preferred relative location and orientation of the components of the device. Deviation of the relative positions and orientations of the components of an assembled device from the preferred relative position and orientation can detract from the device's performance of its intended function and can also make assembly of other components and devices to the assembled device more difficult. As a result many different methods and systems have been developed in attempts to ensure that the relative locations and orientations of components of assembled devices are as close to their preferred location as possible. In the past assembly of devices has been done in assembly fixtures and verification and/or adjustment of the relative locations and orientations of the components of devices has been done with check fixtures. Additionally many other methods of measurement have been developed for checking relative location and orientations of components of devices during and after assembly. Many of the systems and methods utilized to date to ensure assembly of components of devices as close to the preferred relative locations and orientations do, however, have drawbacks including high cost, poor results, and increased assembly labor.

SUMMARY OF INVENTION

As a result, an object of the present invention is to provide a relatively low cost, effective system and method for monitoring the relative locations and orientations of individual components of assembled devices.

The present invention comprises an inspection system and an assembly verification method for determining the relative positions and orientations of components of a device assembled from two or more individual components. The inspection system of the present invention comprises one or more inspection cameras that are fixedly located in such a manner that they are aimed at an inspection area. According to the inspection method of the present invention a device that is being assembled or has been assembled is placed in the inspection area adjacent which the one or more inspection cameras are disposed in positions such that when the device is disposed within the inspection area the device is within the viewing are of the one or more inspection cameras. After the device is in the inspection area the one or more inspection cameras are used to create one or more two-dimensional images of the device. The two-dimensional image of the device is then utilized as an aid in determining the relative positions and orientations of certain components of the device. Those components of the device the relative positions and orientations of which are determined with the assembly verification method and inspection system of the present invention will hereinafter be referred to as inspection components. Once the two-dimensional image of the device is created, the positions of each of a set of predetermined locating features of the inspection components of the device are determined. Utilizing the known positions of the predetermined locating features of the inspection components upon the one or more two-dimensional images of the device the relative positions and or orientations of the inspection components are determined. Once the relative positions and/or orientations of the inspection components are known they can be compared to the preferred relative orientations and/or positions of the inspection components to determine a magnitude and direction of deviation of the positions and/or orientations of the inspection components from their preferred relative positions and/or orientations. Knowledge of the relative positions and/or orientations of the inspection components of the device can be utilized in any of a number of ways. This data may be utilized in any of a number of different quality control analyses. The data may also be utilized to allow for adjustment of the relative positions and/or orientations of the inspection components closer to the preferred relative positions and/or orientations.

Thus, it can be seen that the above-mentioned object of the present invention as well as others not mentioned have been met.

DRAWINGS

Other objects and advantages of the invention will become more apparent upon perusal of the detailed description thereof and upon inspection of the drawings in which.

DETAILS OF INVENTION

Figure 1:
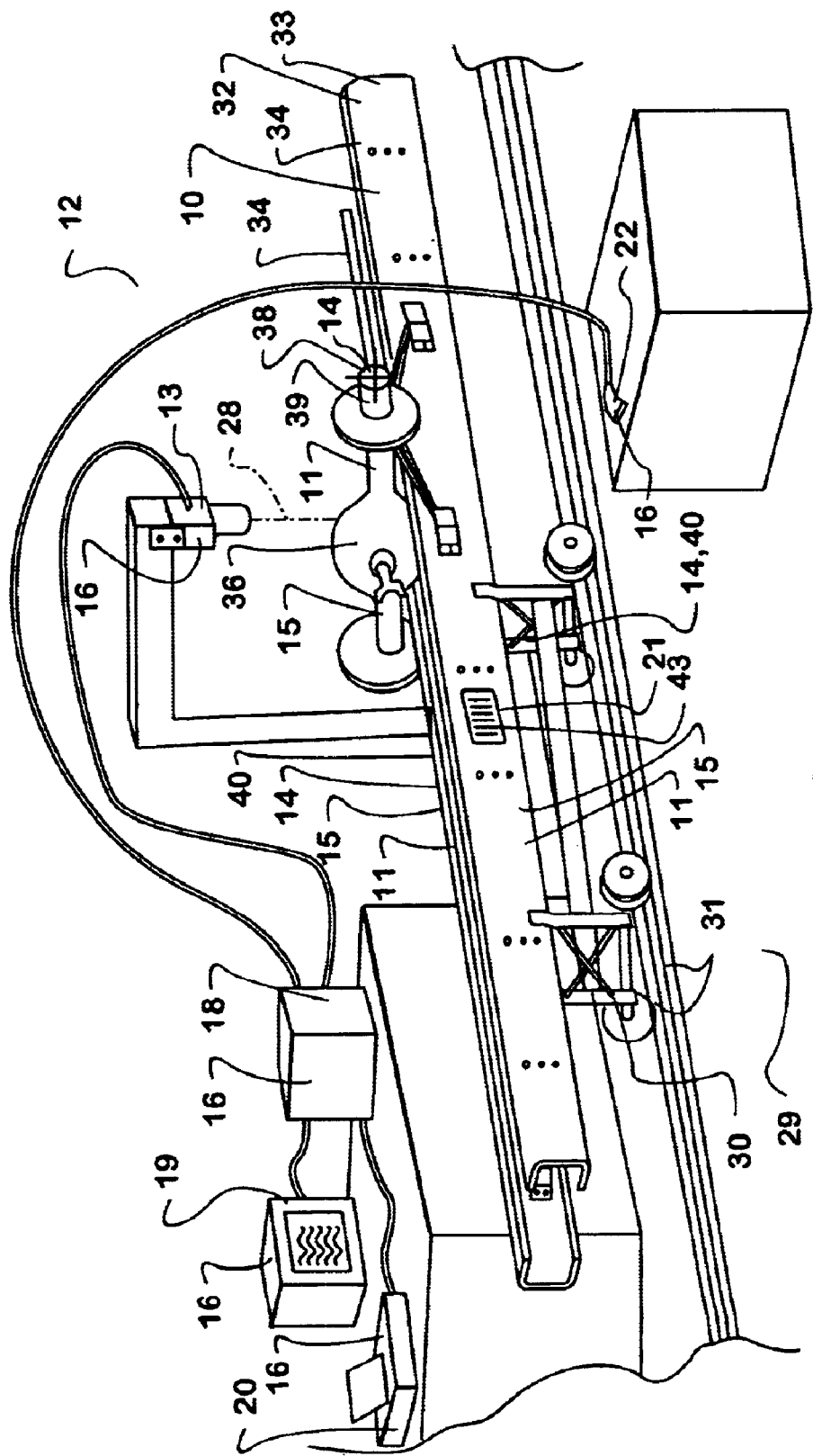
FIG. 1 shows a first embodiment of the inspection system of the present invention with a device, which is a partially assembled chassis of a vehicle, disposed in the inspection area.

The present invention is an inspection system 16 and assembly verification method enabling, among other things, the determination of the relative positions and orientations of components of devices 10 constructed of two or more individual components 11 assembled to one another. The inspection system 16 of the present invention includes an inspection area 12 and one or more inspection cameras 13 mounted in positions such that they are aimed at the inspection area 12 of the inspection system 16. According to the assembly verification method of the present invention a device 10, which has been or is in the process of being assembled from two or more individual components 11, is first placed in the inspection area 12 of the inspection system 16. Of course, in a situation where assembly of the device 10 has not yet commenced, placement in the inspection area 12 of two or more individual components 11 that are to be assembled to one another as part of the assembly of the device 10 would be the first step in the assembly verification process of the present invention. Once the device 10, in whatever stage of assembly it may be in, or two or more individual components 11 are properly located within the inspection area 12 of the inspection system 16, the inspection cameras 13 are utilized to create one or more two-dimensional images of the device 10 or individual components 11 thereof in the inspection area 12. After the one or more two-dimensional images of the device 10 are generated, the relative positions and/or orientations of the individual components 11 of the device 10 may be determined. The assembly verification method of the present invention may comprise determining the relative positions and/or locations of all of the individual components 11 of the device 10 that are shown in the one or more two-dimensional images of the device 10. Alternatively, the assembly verification method of the present invention may comprise determining the relative positions and/or orientations of less than all of the individual components 11 of the device 10. Those individual components 11 the relative positions and/or orientations of which are determined by the assembly verification method of the present invention will hereinafter be referred to as inspection components 15. After the one or more two-dimensional images of the device 10 are generated, predetermined locating features 14 of the inspection components 15 are located within the two-dimensional images and the positions of these predetermined locating features 15 are determined. The positions of these predetermined locating features 15 within the two-dimensional images are then utilized to calculate the relative positions and/or orientations of the inspection components 15 of the device 10. There are many different ways in which the relative positions and/or locations of the inspection components 15 of the device 10 may be calculated that can be easily imagined by one of ordinary skill in the art. An example thereof being a method of calculating relative positions and/or orientations of the inspection components 15 which is described below in the discussion of the preferred embodiment and usage of the present invention.

If the assembly verification method of the present invention is to provide useful results there are a few guidelines according to which a device 10 must be oriented within the inspection area 12 of the inspection system 16. The single most important factor in the positioning of the device 10 within the inspection area 12 being its angle relative to a respective one of the inspection cameras 13 of the inspection system 16 when a two-dimensional image of the device 10 is generated by that respective inspection camera 13. The orientation of a device 10 within the inspection area 12 is most easily described as it relates to a line of sight 18 of each of the inspection cameras 13 of the inspection system 16 and axes perpendicular to the lines of sight 18 of the inspection cameras 13. The orientation of a device 10 within the inspection area 12 should be such that its angular orientations about those axes perpendicular to the line of site 18 of a given inspection camera 13 are held within predetermined relatively narrow ranges. This will help to ensure that the orientation of the device 10 will be in a predetermined appropriate range relative to a the projection plane of the two-dimensional image of the device 10 generated with the aid of the inspection camera 13. The angular orientation of the device 10 about the line of sight 18 of an inspection camera 13 is considerably less important as rotation of the device 10 within the projection plane of the two-dimensional image of the device does not substantially hinder the calculation of relative positions and/or orientations of the inspection components 15 of the device 10. The distance at which the device 10 is disposed from an inspection camera 13 is also, generally, of lesser importance as relative positions and/or orientations of the inspection components 15 can be calculated regardless of the distance of the device 10 from the inspection camera 13. There are a vast number of ways easily imagined by one of ordinary skill in the art for controlling the location and orientation of a device 10 within the inspection area 12 as described above. Some of these ways of controlling the location and orientation of a device 10 within the inspection area 12 are described below as they exist in the preferred embodiments and uses of the present invention.

In the preferred embodiment of the assembly verification method the steps of locating the predetermined locating features 14 of the inspection components 15 of the device 10 and calculating the relative positions and/or orientations of the inspection components 15 are executed by an inspection area computer processor 18 of the inspection system 16. The inspection area computer processor 18 may or may not be physically located adjacent the inspection area 12 of the inspection system 16. In the preferred embodiment one or more of the inspection cameras 13 of the inspection system 16 are communicatively linked to the inspection area computer processor 18 of the inspection system 16 in such a manner that images captured by the inspection cameras 13 may be transferred as electronic data to and stored at least temporarily within memory of the inspection area computer processor 18 of the inspection system 16. In the preferred embodiment the computer programs that are embodied in computer readable medium and that control, in conjunction with user input, the operation of the inspection area computer processor 18 of the inspection system 16 include an image analysis and component location routine. The image analysis and component location routine causes the inspection area computer processor 18 of the inspection system 16 to determine the locations of the predetermined locating features 14 of the inspection components 15 within images of a device 10 transferred from an inspection camera 13 to the inspection area computer processor 18. Algorithms for locating features within images and computer programs which comprise such algorithms are well known and could easily be adapted to perform the function of determining the location, within an image of a device 10, the locations of predetermined locating features 14 of inspection components 15 of the device 10. Once the positions of the predetermined locating features 14 of the inspection components are determined, the image analysis and component location routine mathematically determines the distances and/or angles between respective inspection components 14 of the device 10 in an image. In the preferred embodiment the inspection system 16 is further capable of determining position error and orientation error between respective inspection components 15 of a device 10. The position error is the difference between the actual relative positions of two inspection components 15 and the preferred relative positions of the inspection components 15. The orientation error is the difference between the actual relative orientations of two inspection components 15 and the preferred relative orientation of the inspection components 15. The position error and the orientation error of two inspection components 15 of the device 10 both have a direction and a magnitude. In the preferred embodiment, the inspection area computer processor 18 of the inspection system 16 further has the preferred relative orientations and locations of the inspection components 14 stored in memory. Additionally, in the preferred embodiment the image analysis and component location routine of the inspection area computer processor 18 has an error calculating subroutine that can be utilized to cause the inspection area computer processor 18 to compute the position error and/or magnitude error for each pair of individual components 11 for which the preferred relative position and/or orientations are stored in memory.

In the preferred embodiment the inspection system 16 is further capable of communicating to a user thereof any data such as relative positions, relative orientations, position error, and/or orientation error determined and/or computed by the inspection area computer processor 18 of the inspection system 16. In the preferred embodiment the inspection system 16 comprises an inspection area computer display screen 19 and/or an inspection area computer printer 20 communicatively linked to the inspection area computer processor 18. The results of the analysis of the position of the inspection components 15 may thus be transmitted from the inspection area computer processor 18 to the inspection area computer display screen 19 and displayed for viewing by the user upon the inspection area computer display screen 19 or transmitted to the inspection area computer printer 20 and printed on paper for viewing by a user of the inspection system 16.

Dependent upon the method employed to locate the predetermined locating features 14 of the individual components 11 of a device 10 the assembly verification method of the present invention may or may not include the step of actually creating a human-viewable two-dimensional image. In the preferred embodiment of the present invention, or in any other embodiment of the invention in which a computer processor is utilized to locate the predetermined locating features 14 of the individual components 11 of a device, the creation of electronic data, which could be used by a computer processor to create on a computer screen a human-viewable two-dimensional image, is functionally equivalent to the actual creation of a human-viewable two dimensional image. The creation of such electronic data is functionally equivalent to the actual creation of the two-dimensional image it represents because it is this electronic data and not the two-dimensional image itself that the computer processor utilizes to locate the predetermined locating features 14 of the individual components 11 of the device 10. Thus, in such embodiments of the invention the creation of the actual two-dimensional image is not necessary in order for the inspection system 16 to report to a user thereof data which conveys relative positions, relative orientations, position errors, and/or orientation errors of the individual components 11 of the device 10. In such a case where the inspection cameras 13 are utilized to create electronic data useable by a computer processor to create a two-dimensional image of the device the electronic data may be formatted in any suitable manner a limited number of examples of which are JPEG formatting, Bitmap formatting, and TIFF formatting. In other embodiments of the invention an individual performs the location of the predetermined locating features 14 of the individual components 11 of a device manually. In such embodiments of the invention a user of the inspection system 16 must use the inspection system 16 to create an actual human-viewable two-dimensional image of a device 10 under inspection in order to enable location of the predetermined locating feature 14 of the individual components 11 of the device 10 and subsequent calculation and/or measurement of relative positions, relative orientations, position errors, and/or orientation errors of individual components 11 of the device 10.

The inspection system 16 of the preferred embodiment further has provisions for storing the results of each execution of the assembly verification process so that the results can be retrieved and utilized later. In the preferred embodiment the inspection area computer processor 18 of the inspection system 16 or some other computer processor, to which the inspection area computer processor 18 of the inspection system 16 is communicatively linked, has memory space in which relative positions, relative orientations, position errors, and/or orientation errors can be stored. In the preferred embodiment of the assembly verification method and the inspection system 16 each device that is inspected using the assembly verification method and the inspection system 16 has a unique identifier code such as a serial number or other identification aid associated with it. In the preferred embodiment each device 10 has attached to it an identifier tag 21 that has encoded in or upon it the unique identifier code of the particular device 10. The identifier tag 21 may be a decal, a magnetically encoded strip, optically encoded material, may be painted onto the device 10, or may be of any other construction suitable for carrying the unique identifier code of the device. The unique identifier code of each device may be encoded in any of a number of ways upon the identifier tag 21 of the device 10. In the preferred embodiment the unique identifier codes are encoded upon the identifier tag 21 of each device 10 as a bar code. In the preferred embodiment of the present invention each set of position and orientation data for a device 10 that has been inspected is stored in computer memory linked to the unique identifier code, which is also stored in computer memory, for that device. Storage of data for a given device 10, linked to the unique identifier code for the device 10, in such a manner allows easy retrieval of the data for a given device 10. In the preferred embodiment the inspection system 16 includes an inspection station bar code reader 22 that is communicatively linked to the inspection area computer processor 18 of the inspection system 16 and can be used by an operator of the inspection system 16 to load into the inspection area computer processor 18 the unique identifier code of the device 10 that is being inspected. Also in the preferred embodiment the inspection system 16 comprises a rework area computer processor 23 that is communicatively linked to the computer memory within which the data for each device 10 is stored upon the completion of inspection of the device 10. The rework area computer processor 23 is located adjacent a rework area 24. At the rework area the relative positions and/or orientations of individual components 11 of assembled devices 10 are adjusted to reduce the position error and/or the orientation error of the individual components 11 of the devices 10 to acceptable levels. The inspection system 16 of the preferred embodiment further includes a rework station bar code reader 25 that is communicatively linked to the rework area computer processor 23. Thus, when a device 10 reaches the rework area 24 an operator of the rework area computer processor 23 can use the rework station bar code reader 25 to scan the identifier tag 21 of the device 10 and load into the rework area computer processor 23 the unique identifier of the device 10. Once the unique identifier is loaded into the rework area computer processor 23 the user can easily retrieve the data from computer memory the data for that particular device 10. The inspection system 16 of the preferred embodiment further includes one or both of a rework area computer display screen 26 communicatively linked to the rework area computer processor 23 and a rework area computer printer 27 communicatively linked to the rework area computer processor 23. Thus, once a user of the rework area computer processor 23 has caused it to retrieve the data for a given device 10 the user can cause the data to be displayed upon a rework area computer display screen 26 and/or printed by a rework area computer printer 27 so that they may be availed of the data. The user of the rework area computer processor 23 may, thereafter, utilize the data for the given device to adjust the positions and/or orientations of the individual components 11 of the device 10.

There are any number of positions and orientations in which the inspection cameras 13 and a device 10 may be disposed relative to the inspection area 12 of the inspection system 16 in accordance with the present invention and the guidelines outlined above for the preferred relative location of a device 10 within the inspection area 12 and the inspection cameras 13. Additionally, the positions and orientations of the inspection cameras 13 relative to the inspection area 12 may be fixed or moveable. In some embodiments of the present invention the inspection cameras 13 may be mounted to adjustable fixtures or robots either of which can be utilized to securely support an inspection camera 13 in any of a plurality of positions and/or orientations. There may be provisions such as fixtures (which may be static or adjustable fixtures) or robots for fixing a device 10 in one or more respective positions and orientations relative to the inspection area 12 during inspection of the device 10. In cases where the inspection cameras 13 and/or a device 10 within the inspection area 12 are located by adjustable fixtures and/or robots there are a plurality of relative positions and/or orientations in which the inspection cameras 13 and the device 10 can be disposed and, thus, the inspection cameras 13 can be utilized to create two-dimensional images of the device from a number of positions and/or orientations. In the preferred embodiment the inspection cameras 13 are located in a fixed position relative to the inspection area 12. In the preferred embodiment the inspection cameras 13 are oriented with their line of site 28 extending directly vertically downwardly from the inspection camera 13 toward the floor 29 of the inspection area 12. Also in the preferred embodiment each device 10 that is to be inspected using the inspection system 16 is supported upon a track 31, or moving cart 30, or a moving cart 30 upon a track 31 in such a manner that the orientation of the device 10 is stable about axes within the plane of the floor 29. In the preferred embodiment a device 10 supported upon a track 30 or moving cart 31 is moved into the inspection area 12 directly under one or more of the inspection cameras 13 and the inspection cameras 13 are used to create a two-dimensional image of the device 10.

Figure 2:
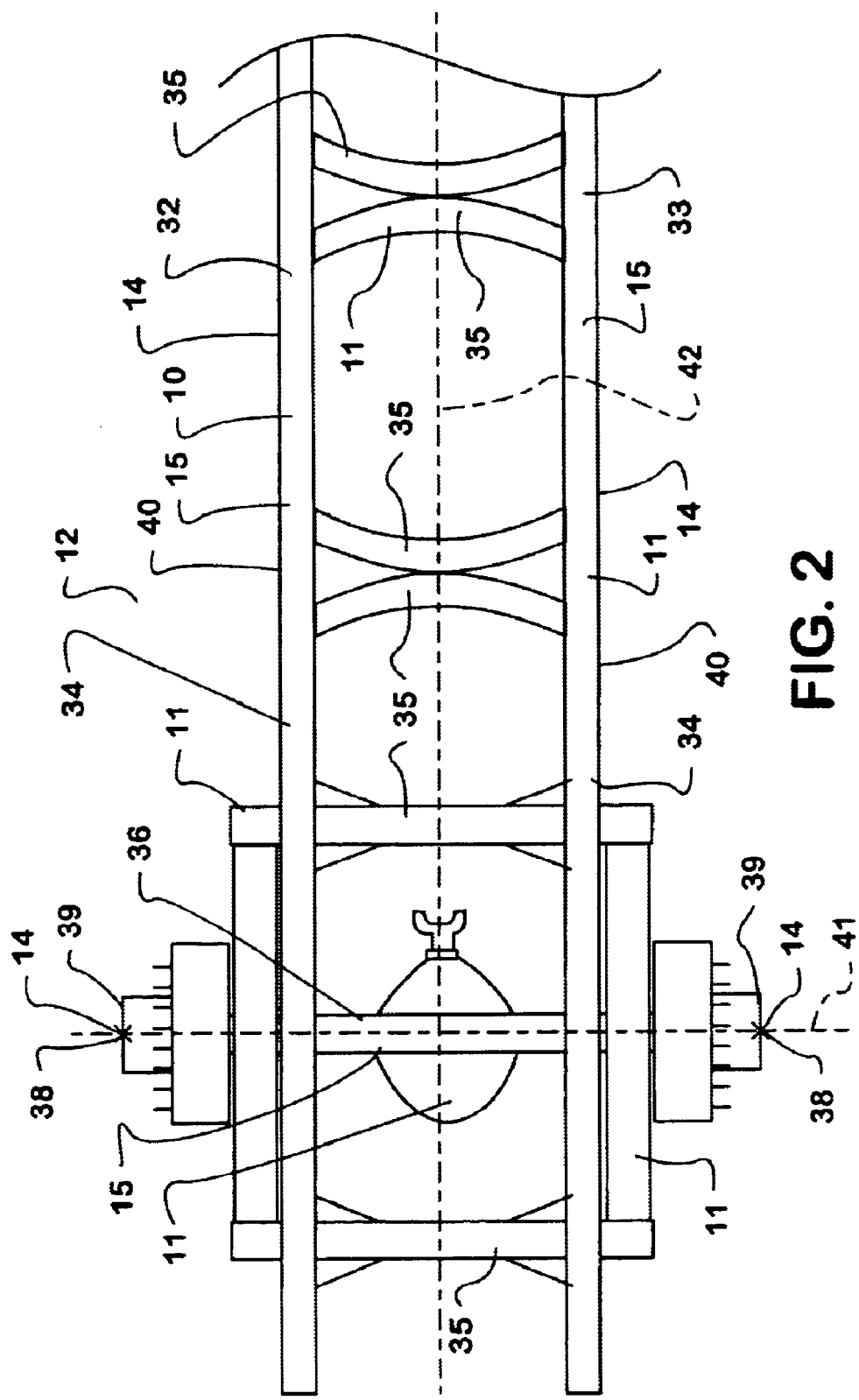
FIG. 2 shows a chassis of a partially assembled chassis of a vehicle as viewed by an inspection camera according to the preferred embodiment of the present invention.
Figure 3:
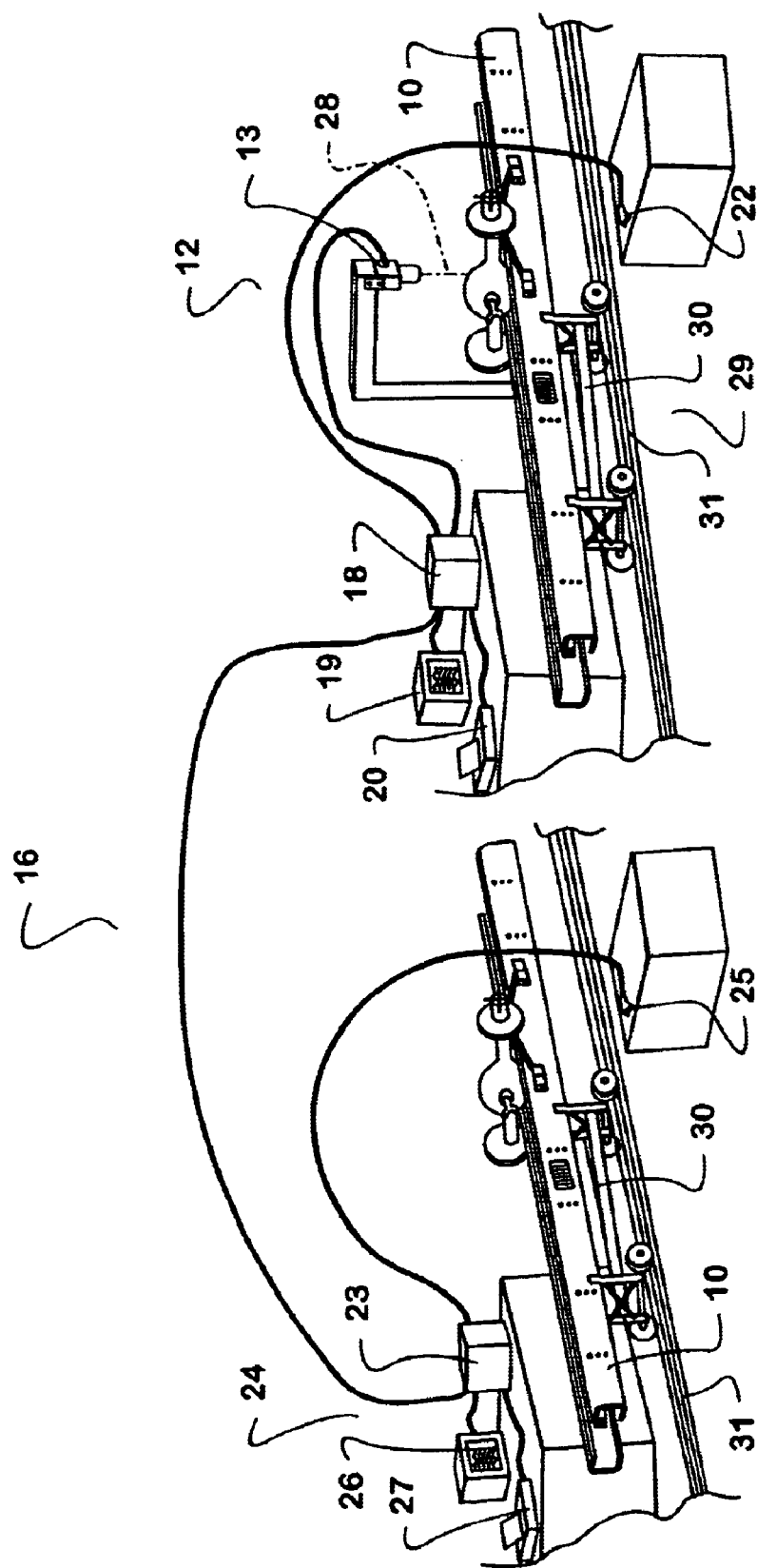
FIG. 3 shows a second embodiment of the inspection system of the present invention, which includes a rework station, with a device, which is a partially assembled chassis of a vehicle, disposed in both the inspection area and the rework area of the inspection system.

The assembly verification method and inspection system of the present invention may be utilized to inspect any of a number of different types of devices 10. One set of devices 10 which the present invention is well suited to inspect includes vehicles and/or subsystems of vehicles. Vehicles and their subsystems are constructed of a number of individual components 11 engaged to one another and the relative positions/orientations of the individual components 11 of an assembled vehicle or subsystem thereof has a substantial impact upon the performance and customer perception of quality of the vehicle. The relative positions and/or orientations of the individual components 11 of an assembled vehicle 10 or subsystem thereof also has a substantial impact on the ease with which other systems and components can subsequently be assembled thereto. The application for which the present invention was developed is the inspection and adjustment of the relative positions and/or orientations of individual components of a chassis 32 of a medium-duty or heavy-duty truck vehicle. FIG. 2 shows such a chassis 32 as it would preferably be viewed by an inspection camera 13 of the inspection system 16 during inspection of the chassis 32. Such a chassis 32 typically includes a frame ladder 33 comprising two frame rails 34 extending parallel to one another and a plurality of cross-members 35 that extend between the frame rails 34. Such a chassis 32 also typically comprises two or more axles 36 attached to the frame ladder 33 and extending transverse to the frame rails 34 of the frame ladder 33. Such a chassis 32 may further include a powertrain and/or other components such as battery boxes and fuel tanks which are not shown in the figures. It will of course be understood that a chassis 32 of a vehicle may include components and systems not mentioned directly above and may not include some of the components or systems mentioned above. It will also be understood that, at a time at which an inspection system 16 according to the present invention is used to perform the assembly verification method of the present invention upon such a chassis 32, the chassis 32 may be in various stages of assembly and may not yet have all of its components assembled to one another.

The specific purpose for which the present invention was initially developed is ensuring positioning of the axles 36 of a chassis 32 of a medium-duty or heavy-duty truck close to their preferred orientation with respect to the frame ladder 33 of the chassis 32. The preferred orientation of the axles 36 with respect to the frame ladder 33 being perpendicular to the frame rails 34 of the frame ladder 33. In this embodiment of the present invention a partially or fully assembled chassis 32, which has one or more axles 36 mounted to it, is supported upon a moving cart 30, which is supported upon a track 31, and the chassis 32 and moving cart are moved into the inspection area 12 directly underneath the inspection cameras 13 of the inspection system 16. The chassis 32 is located at this time within the inspection area 12 with its one or more axles 36 and its frame rails 34 disposed substantially parallel to the floor 29 of the inspection area 12. Once the chassis 32 is disposed in such a manner within the inspection area 12 a user of the inspection system 16 causes the inspection cameras 13 disposed above the chassis 32 to photograph the chassis 32 and electronic data, which has encoded in it information useable by a computer processor to create a two-dimensional image of the chassis 32, is created. This electronic data, within which a two-dimensional image of the chassis 32 is encoded, is then communicated to the inspection area computer processor 18 after which the inspection area computer processor 18 executes the image analysis and component location routine upon this electronic data. During the image analysis and component location routine the inspection area computer processor 18 locates the predetermined locating features 14 of the inspection components 15 of the device 10, which in this case is the chassis 32. In this embodiment the inspection components 15 are the frame rails 34 and one or more of the axles 36 of the chassis 32, as it is their relative orientation that is of interest. In this embodiment he predetermined locating features 14 of the one or more axles 36 are the center points 38 of the ends 39 of the axles 36. In this embodiment the predetermined locating features 14 of the frame rails 34 are the outer edges 40 of the frame rails 34. In this embodiment of the invention the image analysis and component location routine causes the inspection area computer processor 18 to calculate the orientation of an axle centerline 41 that passes through the center points 38 of the ends 39 of the axle 36. The inspection area computer processor 18 also calculates a frame ladder centerline 42 by fitting a line to a set of points equidistant from the outer edges 40 of the frame rails 34. The inspection area computer processor 18 then calculates the angle between the axle centerline 41 and the frame ladder centerline 42. The inspection area computer processor 18, which has stored in memory that the preferred relative orientation of the axle centerline 41 and the frame ladder centerline 42 is perpendicular, subtracts 90 degrees from the calculated value of the angle between the axle centerline 41 and the frame ladder centerline 42 to arrive at the orientation error of the axle 36 relative to the frame ladder 33. The image analysis and component location routine of the computer program that controls the inspection area computer processor 18 always causes the inspection area computer processor 18 to calculate the angle between the axle centerline 41 and the frame ladder centerline 42 within the same one of the four quadrants segmented by the axle centerline 41 and the frame ladder centerline 42. As a result, an orientation error calculated by the inspection area computer processor 18 that is a positive value indicates displacement in one direction from the preferred embodiment and an orientation error that has a negative value indicates displacement from the preferred orientation in an opposite direction. Once the orientation error of the axle 36 relative to the frame ladder 33 is known, the orientation of the axle 36 relative to the frame ladder 33 can be adjusted toward the preferred orientation. This adjustment can take place within the inspection area 12 at the time of inspection, or if the results of the inspection are stored in computer memory or on a computer printout the adjustment could take place at a later time and place such as at a rework area as described above. Of course it will be understood that while the example of determining the orientation error of an axle 36 relative to a frame ladder 33 has been described for exemplary purposes, many other embodiments of the assembly verification method and the inspection system 16 of the present invention may be used to inspect many other types of devices 10.

In the embodiment of the present invention in which the assembly verification method includes a step of adjusting the position and/or orientation of inspection components 15 of a device 10 while the device is in the inspection area 12, the inspection system 16 may be utilized to communicate to the individual performing adjustment the effectiveness of the adjustments. In order to accomplish this a user of the inspection system 16 would first utilize the inspection system 16 to determine initial position errors and/or orientation errors of the inspection components 15, subsequently adjust the position and or orientation of the inspection components, and then determine the effectiveness of the adjustment by utilizing the inspection system 16 to determine position errors and/or orientation errors after the adjustment. This procedure may be repeated by a user of the inspection system 16 until they are satisfied with the position errors and/or orientation errors present between the inspection components 15 of the device under inspection. This process of adjusting the positions and orientations of inspection components 15 of a device 10 under inspection with feedback from the inspection system 16 is improved as the speed increases at which the inspection system 16 can update the user of the system on the current position and/or orientation errors present between the inspection components 15 of the device under inspection. According to some embodiments of the present invention the position and/or orientation errors between inspection components 15 of a device 10 under inspection may be updated virtually instantaneously after adjustment of the position and/or orientations of inspection component 15 of the device 10. Such an embodiment of the invention would comprise an inspection system 16 configured in such a manner that the inspection cameras 13 take multiple pictures of the device 10 in rapid succession and transmit electronic data with a two-dimensional image encoded in it to the inspection area computer processor 18 each time the inspection camera 13 takes another picture. Such a system could easily be configured to take a new picture of the device 10 under inspection and to update the calculated position errors and/or orientation errors many times per second. Such a construction and operation of the inspection system 16 would, thus, allow for updating of the position errors and/or orientation errors determined by the inspection system 16 in virtually a real-time manner and thus allow for adjustment of the positions and/or orientations of the inspection components 15 of the device 10 under inspection in virtually a real time manner.

The inspection area 12 of the present invention may be part of an assembly line for devices 10. As is well known, such an assembly line comprises a number of work areas disposed adjacent one another through which the devices 10 that are constructed on the assembly line move consecutively as the devices 10 are assembled. According to this embodiment of the present invention the inspection area 12 of the inspection system 16 would be located at or between one or more of the workstations of the assembly line and the inspection cameras 13 of the inspection system 16 would take pictures of the devices that are being constructed as the devices 10 move past the cameras 13.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

I claim:

1. A computer program for an inspection area computer processor of an inspection system, said computer program comprising:

(a) a computer useable medium having computer readable program code means embodied in said medium for causing the inspection area computer processor to perform the steps of:

locating within electronic data, which has a two-dimensional image of a fully or partially assembled device encoded within it, predetermined locating features of two or more inspection components of the device;

calculating relative positions or orientation the two or more inspection components of the device;

calculating one or more position errors or orientation errors between the inspection components of the device by subtracting from the calculated relative positions or orientations of the inspection components preferred relative positions or orientations of the inspection components;

causing one or more of the calculated relative positions, calculated relative orientations, positions errors, or orientation errors to be displayed upon an inspection area computer display screen to which the inspection area computer processor is communicatively linked;

(b) said step of locating two or more predetermined locating features of the inspection components more specifically comprises the steps of:

locating within electronic data, which has a two-dimensional image of a fully or partiality assembled chassis of a vehicle encoded within it, center points of ends of an axle which is part of the chassis; and locating within the electronic data, which has a two-dimensional image of a fully or partially assembled chassis encoded within it, outer edges of frame rails of the chassis;

(c) said step of calculating relative positions or orientations of the two or more inspection components of the device more specifically comprises the steps of:

calculating an orientation of an axle centerline which is defined as being the line that passes through the center points of the ends of the axle;

calculating an orientation of a frame ladder centerline, which is a centerline of a frame ladder of the chassis, by fitting a line to points that are equidistant from the outer edges of the frame rails of the chassis;

calculating an angle between said axle centerline and said frame ladder centerline;

(d) said step of calculating one or more position errors or orientation errors between the inspection components of the device more specifically comprises the step of:

calculating an orientation error of said axle centerline relative to said frame ladder centerline by subtracting from the angle between the axle centerline and the frame ladder centerline 90 degrees, which is a preferred orientation of the axle centerline relative to the frame ladder centerline; end (e) said step of causing one or more of the calculated relative positions, calculated relative orientations, positions errors, or orientation errors to be displayed upon an inspection area computer display screen, to which the inspection area computer processor is communicatively linked, more specifically comprises the step of:

causing the angle between the axle centerline and the frame ladder centerline or the orientation error of the axle centerline relative to the frame ladder centerline to be displayed upon an inspection area computer display screen to which the inspection area computer processor is communicatively linked.

2. A computer program for an inspection area computer processor of an inspection system, said computer program comprising:

(a) a computer useable medium having computer readable program code means embodied in said medium for causing the inspection area computer processor to perform the steps of:

locating within electronic data, which has a two-dimensional image of a fully or partially assembled device encoded within it, predetermined locating features of two or more inspection components of the device;

calculating relative positions or orientations of the two or more inspection components of the device;

(b) said step of locating two or more predetermined locating features of the inspection components more specifically comprises the steps of:

locating within electronic data, which has a two-dimensional image of a fully or partially assembled chassis of a vehicle encoded within it, center points of ends an axle which is part of the chassis; and locating within the electronic data, which has a two-dimensional image of a fully or partially assembled chassis encoded within it, outer edges of frame rails of the chassis; and (c) said step of calculating relative positions or orientations of the two or more inspection components at the device more specifically comprises the steps of:

calculating an orientation of an axis centerline which is defined as being the line that passes through the center points of the ends of the axle;

calculating an orientation of a frame ladder centerline, which is a centerline of a frame ladder of the chassis, by fitting line to points that are equidistant from the outer edges of the frame rails of the chassis; and calculating an angle between said axle centerline and said frame ladder centerline.

3. A computer program for an inspection area computer processor of an inspection system, said computer program comprising:

(a) a computer useable medium having computer readable program code means embodied in said medium for causing the inspection area computer processor to rapidly and sequentially repeat the steps of:

locating within electronic data, which has a two-dimensional image of a fully or partially assembled device encoded within it, predetermined locating features of two or more inspection components of the device;

calculating relative positions or relative orientations between the two or more inspection components of the device;

causing one or more calculated relative positions or calculated relative orientations of the inspection components to be displayed upon an inspection area computer display screen to which the inspection area computer processor is communicatively linked;

(b) said computer program causes the inspection area computer processor to repeat said sequentially and repeatedly executed steps multiple times per minute;

(c) said step of locating two or more predetermined locating features of the inspection components more specifically comprises the steps of:

locating within electronic data, which has a two-dimensional image of a fully or partially assembled chassis of a vehicle encoded within it, center points of ends of an axle which is part of the chassis; and locating within the electronic data, which has a two-dimensional image of a fully or partially assembled chassis encoded within it, outer edges of frame rails of the chassis;

(d) said step of calculating relative positions or orientations of the two or more inspection components of the device more specifically comprises the steps of:

calculating an orientation of an axle centerline which is defined as being the line that passes through the center points of the ends of the axle;

calculating a position and orientation of a frame ladder centerline, which is a centerline of a frame ladder of the chassis, by fitting a line to points that are equidistant from the outer edges at the frame rails of the chassis;

calculating an angle between said axle centerline and said frame ladder centerline; and (e) said step of causing one or more of the calculated relative positions or calculated relative orientations to be displayed upon an inspection area computer display screen, to which the inspection area computer processor is communicatively linked, more specifically comprises the step of:

causing the angle between the axle centerline and the frame ladder centerline to be displayed upon an inspection area computer display screen to which the inspection area computer processor is communicatively linked.

4. A computer program for an inspection area computer processor of an inspection system, said computer program comprising:

(a) a computer useable medium having computer readable program code means embodied in said medium for causing the inspection area computer processor to rapidly and sequentially repeat the steps of:

locating within electronic data, which has a two-dimensional image of a fully or partially assembled device encoded within it, predetermined locating features of two or more inspection components of the device;

calculating one or more relative positions or relative orientations of the two or more inspection components of the device;

calculating one or more orientation errors or position errors of the inspection components of the device by subtracting from calculated relative positions or calculated relative orientations preferred relative positions or preferred relative orientations; and causing one or more calculated relative positions, calculated relative orientations, calculated position errors, or calculated orientation errors of the inspection components of the device to be displayed upon an inspection area computer display screen to which the inspection area computer processor is communicatively linked;

(b) said computer program causes the inspection area computer processor to repeat said sequentially and repeatedly executed steps multiple times per minute;

(c) said step of locating two or more predetermined locating features of the inspection components more specifically comprises the steps of:

locating within electronic data, which has a two-dimensional image of a fully or partially assembled chassis of a vehicle encoded within it, center points of ends of an axle which is part of the chassis; and locating within the electronic data, which has a two-dimensional image of a fully or partially assembled chassis encoded within it, outer edges of frame rails of the chassis;

(d) said step of calculating relative positions or orientations of the two or more inspection components of the device more specifically comprises the steps of:

calculating an orientation of an axle centerline which is defined as being the line that passes through the center points of the ends of the axle;

calculating an orientation of a frame ladder centerline, which is a centerline of a frame ladder of the chassis, by fitting a line to points that are equidistant from the outer edges of the frame rails of the chassis;

calculating an angle between said axle centerline and said frame ladder centerline;

(e) said step of calculating one or more position errors or orientation errors between the inspection components of the device more specifically comprises the step of:

calculating an orientation error of said axle center line relative to said frame ladder centerline by subtracting from the angle between the axle centerline and the frame ladder centerline 90 degrees, which is a preferred orientation of the axle centerline relative to the frame ladder centerline; and (f) said step of causing one or more of the calculated relative positions, calculated relative orientations, positions errors, or orientation errors to be displayed upon an inspection area computer display screen, to which the inspection area computer processor is communicatively linked, more specifically comprises the step of:

causing the angle between the axle centerline and the frames ladder centerline or the orientation error of the axle centerline relative to the frame ladder centerline to be displayed upon an inspection area computer display screen to which the inspection area computer processor is communicatively linked.

5. A computer program for an inspection area computer processor of an inspection system, said computer program comprising:

(a) a computer useable medium having computer readable program code means embodied in said medium for causing the inspection area computer processor to perform the steps of:

locating within electronic data, which has a two-dimensional image of a fully or partially assembled device encoded within it, predetermined locating features of two or more inspection components of the device;

calculating relative positions or orientations of the two or more inspection components of the device;

(b) said computer program further causes the inspection area computer processor to perform the step of:

causing a computer printer, which is communicatively linked to the inspection area computer processor, to print the calculated relative positions or the calculated relative orientations of the inspection components;

(c) said computer program further causes said inspection area computer processor to perform the step of:

causing the computer printer that is communicatively linked to the inspection area computer processor to print a unique identifier for the device in a manner such that the printed unique identifier is associated with the printed calculated relative positions or printed calculated relative orientations;

(d) said computer program further causes said inspection area computer processor to perform the steps of:

when an individual scans a bar code symbol, which is affixed to the device and which has the unique identifier for the device encoded within it, receiving the unique identifier for the device from a bar code scanner that is communicatively linked to the inspection area computer processor and that the individual has used to scan the bar code symbol affixed to the device; and storing the unique identifier received from the bar code scanner at least temporarily in computer memory so that the unique identifier is available to the inspection area computer processor for said step of causing the computer printer to print the unique identifier;

(e) said step of locating two or more predetermined locating features of the inspection components more specifically comprises the steps of:

locating within electronic data, which has a two-dimensional image of a fully or partially assembled chassis of a vehicle encoded within it, center points of ends of an axle which is part of the chassis; and locating within the electronic data, which has a two-dimensional image of a fully or partially assembled chassis encoded within it, outer edges of frame rails of the chassis;

(f) said step of calculating relative positions or orientations of the two or more inspection components of the device more specifically comprises the steps of:

calculating an orientation of an axle centerline which is defined as being the line that passes through the center points of the ends of the axle;

calculating an orientation of a frame ladder centerline, which is a centerline of a frame ladder of the chassis, by fitting a line to points that are equidistant from the outer edges of the frame rails of the chassis;

calculating an angle between said axle centerline and said frame ladder centerline;

(g) said step of causing a computer printer, which is communicatively linked to the inspection area computer processor, to print the calculated relative positions or the calculated relative orientations of the inspection components more specifically comprises the step of:

causing the computer printer that is communicatively linked to the inspection area computer processor to print the angle between the axle centerline and the frame ladder centerline.

6. A computer program for an inspection area computer processor of an inspection system, said computer program comprising:
   (a) a computer useable medium having computer readable program code means embodied in said medium for causing the inspection area computer processor to perform the steps of:
      locating within electronic data, which has a two-dimensional image of a fully or partially assembled device encoded within it, predetermined locating features of two or more inspection components of the device;
      calculating relative positions or orientations of the two or more inspection components of the device;
   (b) said computer program further causes the inspection area computer processor to perform the step of:
      causing a computer printer, which is communicatively linked to the inspection area computer processor, to print the calculated relative positions or the calculated relative orientations of the inspection components;
   (c) said computer program further causes said inspection area computer processor to perform the step of:
      causing the computer printer that is communicatively linked to the inspection area computer processor to print a unique identifier for the device in a manner such that the printed unique identifier is associated with the printed calculated relative positions or printed calculated relative orientations;
   (d) said computer program further causes said inspection area computer processor to perform the steps of:
      when an individual scans a bar code symbol, which is affixed to the device and which has the unique identifier for the device encoded within it, receiving the unique identifier for the device from a bar code scanner that is communicatively linked to the inspection area computer processor and that the individual has used to scan the bar code symbol affixed to the device; and
      storing the unique identifier received from the bar code scanner at least temporarily in computer memory so that the unique identifier is available to the inspection area computer processor for said step of causing the computer printer to print the unique identifier;
   (e) said step of locating two or more predetermined locating features of the inspection components more specifically comprises the steps of:
      locating within electronic data, which has a two-dimensional image of a fully or partially assembled chassis of a vehicle encoded within it, center points of ends of an axle which is part of the chassis; and
      locating within the electronic data, which has a two-dimensional image of a fully or partially assembled chassis encoded within it, outer edges of frame rails of the chassis;
   (f) said step at calculating relative positions or orientations of the two or more inspection components of the device more specifically comprises the steps of:
      calculating an orientation of an axle centerline which is defined as being the line that passes through the center points of the ends of the axle;
      calculating an orientation of a frame ladder centerline, which is a centerline of a frame ladder of the chassis, by fitting a line to points that are equidistant from the outer edges of the frame rails of the chassis;
      calculating an angle between said axle centerline and said frame ladder centerline;
   (g) said step of storing the calculated relative positions or the calculated relative orientations of the inspection components in computer memory more specifically comprises the step of:
      storing the angle between the axle centerline and the frame ladder centerline in computer memory.

7. An inspection system for facilitating inspection of a fully or partially assembled vehicle, which includes a frame ladder with frame rails that have outer edges and an axle which has center points of its ends, by generating electronic data that has a two-dimensional image of the fully or partially assembled vehicle, said inspection system comprising:
   (a) an inspection area within which the device may be positioned;
   (b) one or more inspection cameras stably supported in a position above said inspection area and in an orientation such that a line of site of each of said inspection camera(s) extends from said inspection camera toward said inspection area;
   (c) an inspection area computer processor that is communicatively linked to said inspection cameras that are digital electronic cameras in such a manner that said inspection area computer processor may receive from said inspection cameras electronic data that has two-dimensional image(s) of the inspection area encoded within it;
   (d) a computer program embodied in computer readable medium, accessible by said inspection area computer processor, and operable to cause said inspection area computer processor to perform the steps of:
      locating within electronic data, which has a two-dimensional image of the fully or partially assembled vehicle encoded within it, the center points of the ends of the axle; and
      locating within the electronic data, which has a two-dimensional image of the fully or partially assembled vehicle encoded within it, the outer edges of the frame rails of the chassis;
      calculating an orientation of an axle centerline, which is defined as being the line that passes through the center points of the ends of the axle;
      calculating art orientation of a frame ladder centerline, which is a centerline of a frame ladder of the chassis, by fitting a line to points that are equidistant from the outer edges of the frame rails of the chassis; and
      calculating an angle between said axle centerline and said frame ladder centerline.

8. The inspection system of claim 7, wherein:
   (e) said computer program is operable to cause said inspection area computer processor to perform the further step of:
      calculating an orientation error of said axle centerline relative to said frame ladder centerline by subtracting from said angle between said axle centerline and said frame ladder centerline 90 degrees, which is a preferred orientation of said axle centerline relative to said frame ladder centerline, from said angle between said axle centerline and said frame ladder centerline.

9. The inspection system of claim 8, wherein:
   (f) said inspection system further comprises an inspection area computer display screen;

(g) said inspection area computer processor is communicatively linked to said inspection area computer display screen; and (h) said computer program is operable to cause said inspection area computer processor to perform the further step of:

causing said angle between said axle centerline or said orientation error between said axle centerline and said frame ladder centerline to be displayed upon said inspection area computer display screen.

10. The inspection system of claim 7, wherein:

(e) said inspection system further comprises an inspection area computer display screen;

(f) said inspection area computer processor is communicatively linked to said inspection area computer display screen; and (g) said computer program is operable to cause said inspection area computer processor to perform the further step of:

causing said angle between said axle centerline and said frame ladder centerline to be displayed upon said inspection area computer display screen.

11. The inspection system of claim 7, wherein:

(e) said computer program is operable to cause said inspection area computer processor to perform the further step of:

storing said angle between said axle centerline and said frame ladder centerline to be stored in computer memory.

12. The inspection system of claim 8, wherein:

(f) said computer program is operable to cause said inspection area computer processor to perform the further step of:

storing said angle between said axle centerline or said orientation error between said axle centerline and said frame ladder centerline in computer memory.

\* \* \* \* \*